United States Patent [19]

Yoshimoto et al.

[11] Patent Number: 5,080,882
[45] Date of Patent: Jan. 14, 1992

[54] METHODS OF OZONE DECOMPOSITION AND CATALYST STRUCTURES USED THEREIN

[75] Inventors: Masafumi Yoshimoto; Tadao Nakasuji; Kazuhiko Nagano; Kimihiko Yoshida, all of Osaka, Japan

[73] Assignee: Sakai Chemical Industry Co., Ltd., Osaka, Japan

[21] Appl. No.: 489,828

[22] Filed: Mar. 9, 1990

[30] Foreign Application Priority Data

Mar. 10, 1989 [JP] Japan .................. 1-058412
Apr. 7, 1989 [JP] Japan .................. 1-088996
Apr. 22, 1989 [JP] Japan .................. 1-102908

[51] Int. Cl.$^5$ ............................ C01B 13/00
[52] U.S. Cl. ...................... 423/579; 423/219
[58] Field of Search .......... 423/219, 579; 502/527

[56] References Cited

U.S. PATENT DOCUMENTS

| | | | |
|---|---|---|---|
| 2,298,607 | 10/1942 | Anderson | 423/219 |
| 3,269,801 | 8/1966 | Boberg et al. | 423/219 |
| 3,516,783 | 6/1970 | Blanchard | 423/219 |
| 4,184,983 | 1/1980 | Putz et al. | 423/219 |
| 4,200,609 | 4/1980 | Byrd | 423/219 |
| 4,206,083 | 6/1980 | Chang | 423/219 |
| 4,772,580 | 9/1988 | Hamanaka et al. | 502/527 |
| 4,871,693 | 10/1989 | Inoue et al. | 502/527 |

Primary Examiner—Wayne A. Langel
Attorney, Agent, or Firm—Wegner, Cantor, Mueller & Player

[57] ABSTRACT

There is disclosed a catalyst structure for ozone decomposition which comprises a thin porous carrier material which has many micropores in the direction of the thickness of the carrier material and has an ozone decomposition catalyst supported thereon.

Also disclosed is a method of ozone decomposition using such a catalyst structure, in which preferably the catalyst structure comprises a thin porous carrier material which has many micropores not less than 30 μm in diameter in the direction of the thickness of the carrier material and has an ozone decomposition catalyst supported thereon. The carrier material may be of an electrically resistant material, and may be electrified and heated while a gas containing ozone is forcibly passed therethrough.

8 Claims, 2 Drawing Sheets

METHODS OF OZONE DECOMPOSITION AND CATALYST STRUCTURES USED THEREIN

This invention relates to a method of decomposing ozone which is contained, for example, in the air, and a structure, preferably a catalyst structure, having an ozone decomposition catalyst supported thereon, suitably used therein.

There have been proposed various methods of decomposing noxious ozone contained in the air, for example, an adsorption method wherein a porous material is used such as activated carbon or zeolite, or an oxidative decomposition method wherein a catalyst is used such as manganese dioxide.

However, the above mentioned known methods of ozone decomposition are not satisfactory ones. The adsorption method has a disadvantage in that an adsorbent must be very often regenerated since it is limited in adsorption ability. Therefore, the working is laborious and costs a great deal. The oxidative decomposition method has no such disadvantages as above described, but the known catalysts have insufficient decomposition activity for ozone, but also deteriorate in activity very soon when they are used under severe conditions, for example, when a gas which contains high concentrations of ozone is treated or a gas is treated with a high area velocity.

It is, therefore, an object of the invention to provide a structure, preferably a catalyst structure, having an ozone decomposition catalyst supported thereon.

It is a further object of the invention to provide a method of ozone decomposition using such a structure, in which the ozone decomposition rate is maintained high over a long period of time and no substantial decrease in ozone decomposition rate takes place under severe reaction conditions.

In accordance with the invention, there is provided a catalyst structure for ozone decomposition which comprises a thin porous carrier material which has many micropores in the direction of the thickness of the carrier material and has an ozone decomposition catalyst supported thereon.

Further in accordance with the invention, there is provided a method of ozone decomposition which comprises putting a gas containing ozone therein into contact with a catalyst structure comprising a thin porous carrier material which has many micropores in the direction of the thickness of the carrier material and has an ozone decomposition catalyst supported thereon.

Other features and advantages of the invention will be apparent from the following description taken in connection with the accompanying drawings, in which, FIG. 1 is a sectional view of an embodiment of the ozone decomposition reactor which contains a catalyst structure according to the invention;

The thin porous carrier material used in the invention is composed preferably of a metal such as iron, cobalt, molybdenum, titanium, zirconium, chromium, silver, gold, copper, nickel or tin, or an alloy including stainless steels, copper alloys, nickel alloys, tin alloys, chromium alloys, or a ceramic material such as glass, alumina or silicon carbide. Among these are preferred stainless steels such as SUS 430 or 304 from the standpoint of workability, resistivity and resistance to ozone.

The thin porous carrier material used is preferably a net or screen or plate which has a number of micropores of very short length extending in the direction of the thickness of the carrier material. A porous metal plate which has such micropores may be produced by etching a plate or punching micropores in a plate. When the catalyst structure is used in such a manner that a gas containing ozone therein is passed forcibly therethrough, it is preferred that the micropores are not less than 30 $\mu$m in diameter to prevent the occurrence of substantial pressure loss in the reaction.

The carrier material has an ozone decomposition catatalyst supported thereon. Any known catalyst is usable, which includes a metal oxide such as $MnO_2$, $Fe_2O_3$, $Ag_2O$, NiO or CuO, a noble metal such as Pt or Pd, or a mixture of two or more of these. There may be further mentioned, as an effective catalyst, for instance, a Mn containing multicomponent catalyst such as $MnO_2$-$TiO_2$, $MnO_2$-alkali metal or alkaline earth metal oxides; a zeolite containing Cr, Zn, V, W, Fe, Mo, Ni, Co, Ru, Cu, Rh, Pd, Ag or Pt, or an oxide of these metals, a mixture of these; or a zeolite in which K or Na is partly or wholly substituted with such a metal.

The supporting of catalysts on the carrier material will be described hereinafter.

Usually a plurality of the catalyst structures are disposed at intervals in a cylindrical casing to form a catalyst reactor, and a gas containing ozone therein is passed through the reactor to put the gas into contact with the catalyst structure, thereby to catalytically decompose the ozone. The gas may be passed parallel to the catalyst structure in the reactor, or may be forcibly passed through the catalyst structure.

Figure 1:
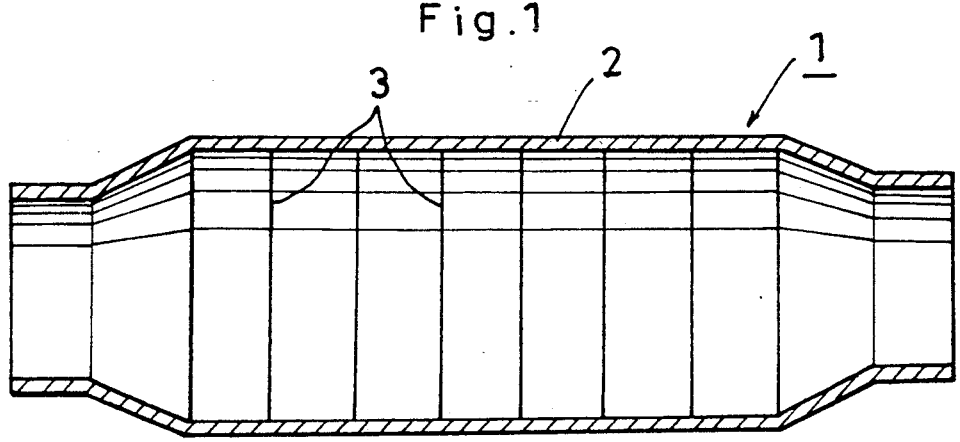
Figure 2:
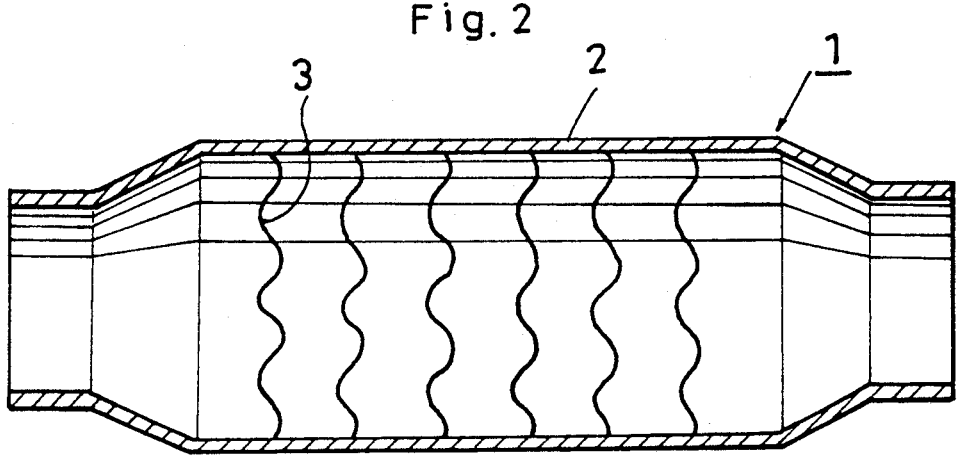
FIGS. 2 and 3 are also sectional views of further embodiments of the ozone decomposition reactor which contains a catalyst structure of the invention.

Preferred embodiments of the catalyst reactor will now be described referring to the drawings. FIG. 1 illustrates a reactor 1 embodying the invention which is composed of a cylindrical casing 2 having openings at the ends and a plurality of catalyst structures 3 extending to radial directions of the casing and disposed parallel to each other at intervals in the casing. In FIG. 2 there is illustrated a reactor 1 which contains a catalyst structure 3 composed of porous corrugated nets, plates or sheets. A gas containing ozone therein is introduced from one end of the casing thereinto, and forcibly passed through the catalyst structure, to decompose the ozone. A so-called cleaned gas is discharged from the other end of the casing.

Figure 3:
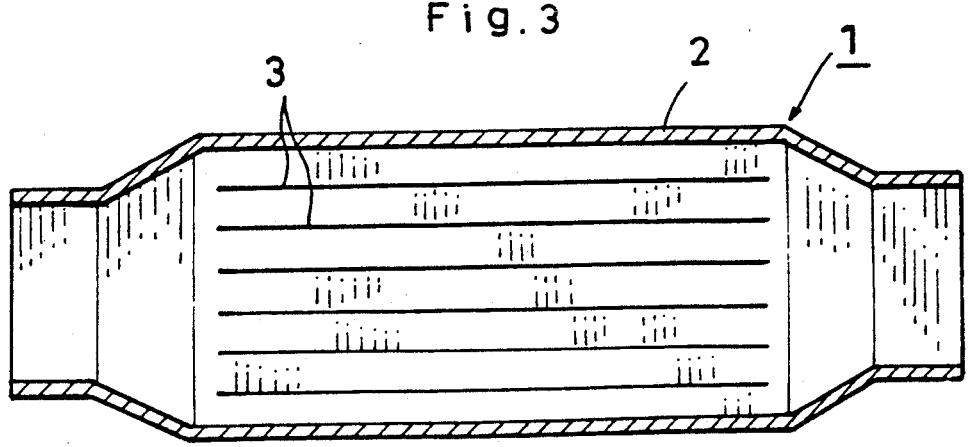

FIG. 3 also illustrates a further embodiment of the reactor 1 which is composed of a cylindrical casing 2 and a plurality of catalyst structures 3 extending to axial directions of the casing and disposed parallel to each other at intervals in the casing. A gas containing ozone therein is introduced into the casing, and the gas is passed parallel to the catalyst structure.

Figure 4:
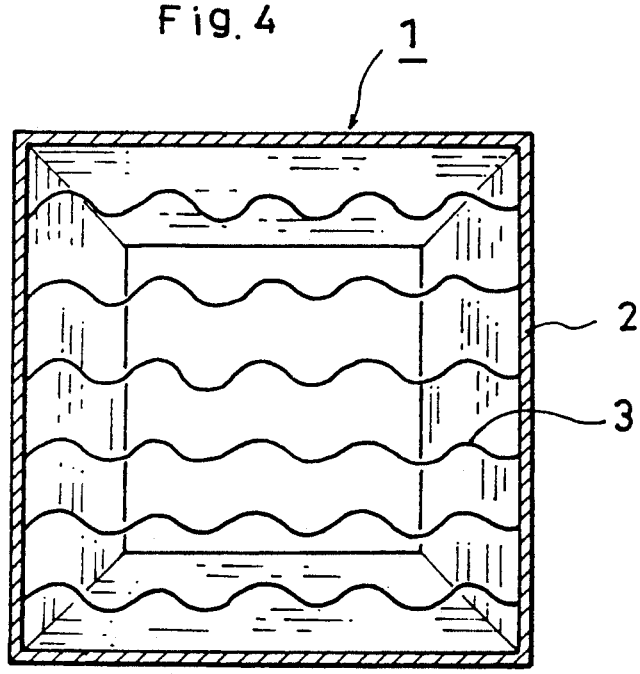
FIG. 4 is a section of the reactor shown in FIG. 3 in the radial direction of the casing.

FIG. 4 is a sectional view of the reactor shown in FIG. 3 in the radial direction wherein corrugated sheets or plates are used as a catalyst structure.

In accordance with the invention, a further method of ozone decomposition is provided, which comprises: putting a gas containing ozone therein into contact with an electrically resistant material while electrifying and heating the electrically resistant material.

This method is applicable to the aforedescribed catalyst structure when the carrier material is of an electrically resistant material. It is preferred that the electrically resistant material has such an ozone decomposition catalyst as described hereinbefore supported thereon.

The electrically resistant material used in the invention is composed preferably of a metal such as iron, cobalt, molybdenum, titanium, zirconium, chromium, silver, gold, copper, nickel or tin, or an alloy including stainless steels, copper alloys, nickel alloys, tin alloys, chromium alloys, or a ceramic material such as silicon carbide. Among these are preferred stainless steels such as SUS 430 or 304 from the standpoint of workability, resistivity and resistance to ozone.

The electrically resistant material used is not specifically limited in form, and may be in the form of wire, plate, stick, tube or honeycomb. However, it is preferred that the electrically resistant material is a net or screen or porous plate which has been described hereinbefore. An electrode such as of copper is mounted on the electrically resistant material so that it is electrified and heated when used in the ozone decomposition reaction.

If necessary, the electrically resistant material, preferably a net or plate having an ozone decomposition catalyst supported thereon, may be further worked or combined together, to have a variety of forms or structures.

In the method of the invention, a gas containing ozone therein is put into contact with the electrically resistant carrier material, preferably in the form of net or screen or plate, having an ozone decomposition catalyst supported thereon, while the electrically resistant carrier material is electrified and heated. As before set forth, when the electrically resistant material is used in such a manner that a gas containing ozone therein is passed therethrough, it is preferred that the micropores are not less than 30 $\mu$m in diameter.

The catalyst may be supported on a carrier material or an electrically resistant carrier material in any manner. For instance, when a steel wire net or a screen is used as a carrier material or an electrically resistant material, the net is heated in the air to form a layer of oxides on the surface of the wire, and an ozone decomposition catalyst is supported thereon. Alumina may be thermally sprayed on a wire net, and an ozone decomposition catalyst may be supported thereon. Wires of a net may be made porous by solving out in part at the surface layer, and alumina is supported thereon, and then a catalyst may be supported on the alumina.

When an aluminum coated carrier material or an electrically resistant material is used, the aluminum is first oxidized, and thereupon an ozone decomposition catalyst may be supported. Alumina may be supported on a net by an electrophoretic method and thereupon a catalyst may be supported. When a carrier material or an electrically resistant material is of silicon carbide, it may be immersed in an aqueous slurry of a catalyst material, and dried, to support the catalyst thereon directly.

However, the supporting of a catalyst on a carrier material or an electrically resistant material should be interpreted in a broad sense in the invention. Therefore, the following treatments are taken in the invention as embodiments of supporting a catalyst on a carrier material or an electrically resistant material. Namely, it is an embodiment of supporting ferric oxide on a stainless steel wire net to heat the net in the air to produce ferric oxide on the surface of the wire. Further, it is also an embodiment of supporting platinum or palladium on a stainless steel wire net to substitute iron in part with platinum or palladium, which has ozone decomposition activity, by an electrochemical manner.

In accordance with the invention, the electrically resistant net or plate is electrified and heated when a gas containing ozone therein is put into contact therewith. Preferably, the gas is forcibly passed through the net or plate, to decompose the ozone preferably at elevated temperatures effectively, as hereinbefore described.

The temperature of the electrically resistant material in the reaction is not less than 20° C., more preferably not less than 40° C., and most preferably not less than 50° C. When the reaction temperature is less than 20° C., high valency oxides produced when ozone is put into contact with the catalyst are not decomposed, but accumulate in the catalyst, thereby to decrease the activity of the catalyst and ozone decomposition rate in the reaction. On the other hand, when an electrically resistant material having no catalyst supported thereon is used, the material is heated preferably to temperatures of not less than 60° C., more preferably to not less than 100° C.

An allowed maximum temperature at which substantially no decrease in ozone decomposition rate in the reaction occurs is determined by a catalyst used and an amount of ozone per unit amount of the catalyst (molecular weight of ozone per unit time). In the invention there is used as an index to determine the allowed maximum temperature, the product of area velocity and concentration (ppm) of ozone at an inlet of a reactor, the product being referred to as CA value hereinafter. The area velocity is defined as a volume of a reactant gas per unit time (m$^3$/hr) divided by a gas contact area per volume of catalyst (m$^3$/m$^2$).

For instance, when manganese dioxide is used as a catalyst and a CA value of 100,000 is employed, the allowed maximum temperature is 60° C., and when a binary catalyst of MnO$_2$/Ag$_2$O and a ternary catalyst of MnO$_2$/Ag$_2$O/TiO$_2$ are used, the allowed maximum temperatures are 55° C. and 40° C., respectively. When a CA value of 1000 is employed, the allowed maximum temperatures are 55° C., 50° C. and 35° C., respectively, with the above mentioned unitary, binary and ternary catalysts.

The ozone decomposition rate is dependent upon an area velocity under fixed reaction temperatures and ozone concentrations, but it varies also depending upon a porous material used and its porosity, e.g., meshes when a net is used, and manners in which the material is deposited in a reactor. More specific description will be given in examples.

The structure and method for ozone decomposition of the invention decomposes ozone efficiently over a long period of time with substantially no decrease in ozone decomposition rate.

The invention will now be described more specifically with reference to examples, but the invention is not limited thereto.

EXAMPLE I

Ozone Decomposition with Catalyst Reactors Provided With Porous Carriers Having Catalysts Supported Thereon

A. Preparation of Catalyst Structures

EXAMPLE 1

SUS screens of 50 meshes (wire diameter of 200 μm, wire distance of 300 μm) were cut to a size of 30 mm×30 mm.

An amount of 500 g of manganese dioxide having a specific surface area of 32 m$^2$/g and micropores of 50 μm average pore size and 100 g of silica sol (Snowtex N by Nissan Kagaku Kogyo K.K.) were fully mixed to provide a slurry of a concentration of 100 g/l.

The screens were immersed in the slurry, air dried at 50° C. and heated at 100° C. for eight hours, to provide catalyst structures having MnO$_2$ supported thereon.

Seven of the screens thus treated were deposited parallel in a cylindrical casing to extend in the radial direction of the casing with a distance of 70 mm between the first and the last screen to form a catalyst reactor. The reactor had a gas contact area of 100 m$^2$/m$^3$ per unit volume.

EXAMPLE 2

An amount of 500 g of manganese dioxide/silver oxide (80/20 in a weight ratio) coprecipitate having a specific surface area of 59 m$^2$/g and micropores of 30 μm in average pore size and 100 g of silica sol (Snowtex N by Nissan Kagaku Kogyo K.K.) were fully mixed to provide a slurry of a concentration of 100 g/l.

The same screens as in the Example 1 were treated with the slurry in the same manner as in the Example 1, to provide catalyst structures having a binary catalyst of MnO$_2$/Ag$_2$O supported thereon.

The screens thus treated were deposited in the same manner as in the Example 1, to form a reactor.

EXAMPLE 3

An amount of 500 g of manganese dioxide/titanium dioxide/silver oxide (70/20/10 in a weight ratio) coprecipitate having a specific surface area of 52 m$^2$/g and micropores of 30 μm in average pore size and 100 g of silica sol (Snowtex N by Nissan Kagaku Kogyo K.K.) were fully mixed to provide a slurry of a concentration of 100 g/l.

The same screens as in the Example 1 were treated with the slurry in the same manner as in the Example 1, to provide catalyst structures having a ternary catalyst of MnO$_2$/TiO$_2$/Ag$_2$O supported thereon.

The screens thus treated were deposited in the same manner as in the Example 1, to form a reactor.

EXAMPLE 4

SUS thin plates of 100 μm thickness which had aluminum plated thereon in about 10 μm thickness was formed into corrugated plates. The plate was heated in air at 900° C. for one hour, to produce alumina on the surface.

The plates were then treated in the same manner as in the Example 3 to provide catalyst structures having a ternary catalyst of MnO$_2$/TiO$_2$/Ag$_2$O supported thereon.

The plates were deposited parallel in a casing to extend in the axial direction of the casing as illustrated in FIGS. 3 and 4, to form a reactor. The corrugated plates had a height of 2.5 mm and a pitch of 4.0 mm, and a length of 70 mm in the axial direction of the casing and a width of 30 mm. Thus, the reactor had a gas contact area of about 1200 m$^2$/m$^3$ per unit volume.

COMPARATIVE EXAMPLE 1

A honeycomb structure of ceramic fiber corrugated sheets having a gas contact area of about 1200 m$^2$/m$^3$ per unit volume (Honeycle by Nichiasu K.K.) was immersed in the same slurry as in the Example 4, air dried at 50° C., and heated at 100° C. for eight hours, to provide a catalyst structure.

The catalyst structure was placed in a Pyrex tube with ceramic fibers as a sealant, to provide a reactor.

B. Measurement of Ozone Decomposition Rate

Figure 5:
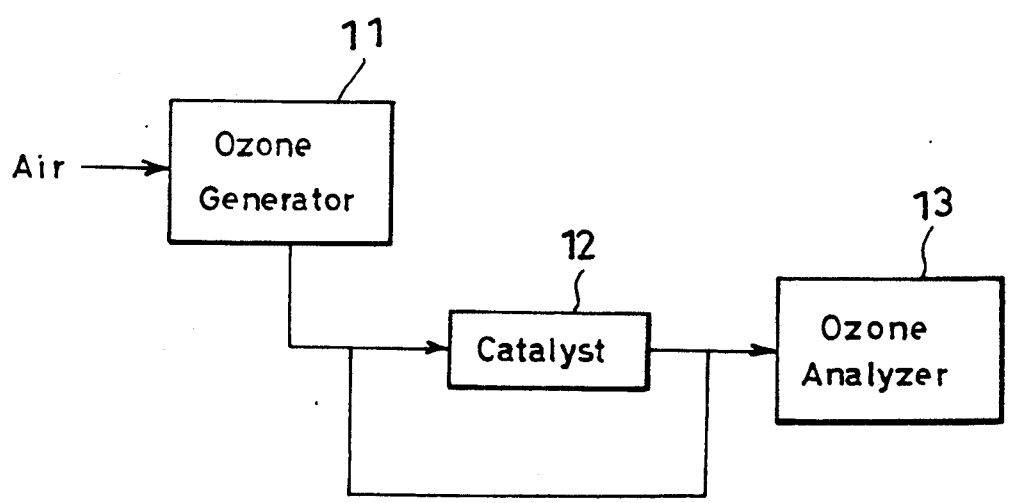
FIG. 5 is a diagram for measurement of ozone decomposition activity of the catalyst.

Ozone decomposition rate was measured with the catalyst reactors manufactured in the Examples 1–4 and Comparative Example 1 as illustrated in FIG. 5, in which, air was introduced into an ozone generator 11 to generate air containing ozone in an appropriate concentration. The air was then sent to the catalyst reactor 12 to catalytically decompose the ozone in the reactor. The ozone concentration in the air was determined with an ozone analyzer 13 at the inlet and the outlet of the reactor. Ozone decomposition rate (%) is calculated based on the expression:

$$\frac{\text{Ozone Concentration at Inlet} - \text{Ozone Concentration at Outlet}}{\text{Ozone Concentration at Inlet}} \times 100 \, (\%).$$

The reaction was carried out at a temperature of 20° C. with an ozone concentration at the inlet of the reactor of 0.2 ppm and an area velocity of 10 m$^3$/m$^2$. The results are shown in the Table 1.

TABLE 1

|  | Ozone Decomposition Rates (%) |
| --- | --- |
| Example 1 | 88.5 |
| Example 2 | 90.7 |
| Example 3 | 91.8 |
| Example 4 | 87.1 |
| Comparative 1 | 75.3 |

EXAMPLE II

Ozone Decomposition with Catalyst Reactors Provided With Porous Materials Having Catalysts or No Catalysts Supported Thereon While Electrifying the Material

Example 1

SUS screens of 50 meshes (wire diameter of 200 μm, wire distance of 300 μm) were cut to a size of 30 mm×35 mm, and electrodes were mounted on the longer sides.

Seven of these screens thus prepared were deposited parallel in a cylindrical casing to extend in the radial direction of the casing with a distance of 70 mm between the first and the last screen to form a catalyst reactor. The reactor has a gas contact area of 100 m$^2$/m$^3$ per unit volume.

Example 2

An amount of 500 g of manganese dioxide having a specific surface area of 59 m$^2$/g and micropores of 30

μm in average pore size and 100 g of silica sol (Snowtex N by Nissan Kagaku Kogyo K. K.) were fully mixed to provide a slurry of a concentration of 100 g/l.

The same screens as in the Example 1 were treated with the slurry in the same manner as in the Example 1, to provide catalyst structures having a catalyst of manganese dioxide supported thereon.

The screens thus treated were deposited in the same manner as in the Example 1, to form a reactor.

Example 3

An amount of 500 g of MnO$_2$Ag$_2$O (80/20 in a weight ratio) coprecipitate having a specific surface area of 59 m$^2$/g and micropores of 30 μm in average pore size and 100 g of silica sol (Snowtex N by Nissan Kagaku Kogyo K. K.) were fully mixed to provide a slurry of a concentration of 100 g/l.

The same screens as in the Example 1 were treated with the slurry in the same manner as in the Example 1, to provide catalyst structures having a binary catalyst of MnO$_2$/Ag$_2$O supported thereon.

The screens thus treated were deposited in the same manner as in the Example 1, to form a reactor.

EXAMPLE 4

An amount of 500 g of MnO$_2$/TiO$_2$/Ag$_2$O (70/20/10 in a weight ratio) coprecipitate having a specific surface area of 52 m$^2$/g and micropores of 30 μm in average pore size and 100 g of silica sol (Snowtex N by Nissan Kagaku Kogyo K. K.) were fully mixed to provide a slurry of a concentration of 100 g/l.

The same screens as in the Example 1 were treated with the slurry in the same manner as in the Example 1, to provide cayalyst structures having a ternary catalyst of MnO$_2$/TiO$_2$/Ag$_2$O supported thereon.

The screens thus treated were deposited in the same manner as in the Example 1, to form a reactor.

Example 5

SUS thin plates of 100 μm a thickness which had aluminum plated thereon in about 10 μm thickness were formed into corrugated plates. The plates were heated in air at 900° C. for one hour, to produce alumina on the surface.

The plates were then treated in the same manner as in the Example 4 to provide catalyst structures having a ternary catalyst of MnO$_2$/TiO$_2$/Ag$_2$O supported thereon.

The corrugated plates were deposited in a casing as illustrated in FIGS. 3 and 4, to form a reactor. The corrugated plates had a height of 2.5 mm and a pitch of 4.0 mm, and a length of 70 mm in the axial direction of the casing and a width of 30 mm. Thus, the reactor had a gas contact area of about 1200 m$^2$/m$^3$ per unit volume.

B. Measurement of Ozone Decomposition Rate

Ozone decomposition rate was measured with the catalyst reactors manufactured in the Examples 1-5 in the same manner as in the Example I, at a temperature of 20°-70° C. (by electrifying to heat electrically resistant carrier material when needed) with varied ozone concentrations at the inlet of the reactor and area velocities so that CA values were in the range of 100-10,000. The ozone decomposition rate was measured at the initial stage, after 100 hours and 1000 hours, respectively. The results are shown in the Table 2.

TABLE 2

| | Temperature of Carrier Material (°C.) | Ozone Concentration at Inlet (ppm) | CA Values*) | Ozone Decomposition Rate Initial | After 100 hours (%) | 1000 hours |
|---|---|---|---|---|---|---|
| Example 1 | 50 | 100 | 1000 | 87.3 | 12.4 | 5.1 |
| | 60 | 100 | 1000 | 92.5 | 64.1 | 27.7 |
| | 70 | 100 | 1000 | 96.3 | 95.4 | 95.1 |
| Example 2 | 20 | 1000 | 1000 | 84.8 | 49.7 | 10.3 |
| | | 500 | 5000 | 81.3 | 37.4 | 9.1 |
| | | 1000 | 10000 | 78.4 | 31.0 | 8.5 |
| | 30 | 100 | 1000 | 90.4 | 62.9 | 22.2 |
| | | 500 | 5000 | 86.9 | 50.8 | 14.5 |
| | | 1000 | 10000 | 80.1 | 35.0 | 8.8 |
| | 50 | 100 | 1000 | 96.9 | 96.5 | 96.7 |
| | | 500 | 5000 | 92.0 | 87.5 | 67.5 |
| | | 1000 | 10000 | 88.1 | 80.7 | 48.3 |
| Example 3 | 30 | 1000 | 10000 | 98.6 | 95.3 | 47.2 |
| | 40 | 1000 | 10000 | 99.9 | 99.5 | 90.3 |
| | 50 | 1000 | 10000 | 100 | 100 | 97.2 |
| Example 4 | 30 | 1000 | 10000 | 98.3 | 94.9 | 77.6 |
| | 40 | 1000 | 10000 | 99.6 | 98.4 | 94.9 |
| | 50 | 1000 | 10000 | 100 | 100 | 100 |
| Example 5 | 30 | 1000 | 10000 | 98.3 | 94.9 | 74.0 |
| | 40 | 1000 | 10000 | 99.6 | 98.4 | 96.1 |
| | 50 | 1000 | 10000 | 100 | 100 | 100 |

*)ppm · m$^3$/m$^2$ · hr

EXAMPLE II

Ozone Decomposition with Catalyst Reactors Provided With Porous Materials Having Catalysts or No Catalysts Supported Thereon While Electrifying the Material

Example 1

SUS thin plates of 500 μm thick were cut to a size of 70 mm × 35 mm, and electrodes were mounted on the longer sides.

Six of these plates were deposited parallel in a cylindrical casing to extend in the axial direction of the casing with a distance of 5 mm therebetween, as illustrated in FIG. 3, to form a reactor. The reactor had a gas contact area of 100 m$^2$/m$^3$ per unit volume.

EXAMPLE 2

An amount of 500 g of manganese dioxide having a specific surface area of 32 m$^2$/g and micropores of 50 μm in average pore size and 100 g of silicasol (Snowtex N by Nissan Kagaku Kogyo K. K.) were fully mixed to provide a slurry of a concentration of 100 g/l.

The same plates as in the Example 1 were heated in air at 500° C. for one hour, and then were immersed in the slurry, air dried at 50° C. and heated at 100° C. for eight hours, to provide catalyst structures having manganese dioxide supported thereon.

The catalyst structures were then deposited in the same manner as in the Example 1, to form a reactor.

EXAMPLE 3

An amount of 500 g of $MnO_2/Ag_2O$ (80/20 in a weight ratio) coprecipitate having a specific surface area of 59 $m^2/g$ and micropores of 30 $\mu m$ in average pore size and 100 g of silica sol (Snowtex N by Nissan Kagaku Kogyo K.K.) were fully mixed to provide a slurry of a concentration of 100 g/l.

The same plates as in the Example 1 were heated in air at 500° C. for one hour, and then were immersed in the slurry, air dried at 50° C. and heated at 100° C. for eight hours, to provide catalyst structures having a binary catalyst of $MnO_2/Ag_2O$ supported thereon.

The catalyst structures were then deposited in the same manner as in the Example 1, to form a reactor.

EXAMPLE 4

An amount of 500 g of $MnO_2/TiO_2/Ag_2O$ (70/20/10 in a weight ratio) coprecipitate having a specific surface area of 52 $m^2/g$ and micropores of 30 $\mu m$ in average pore size and 100 g of silica sol (Snowtex N by Nissan Kagaku Kogyo K. K.) were fully mixed to provide a slurry of a concentration of 100 g/l.

The same plates as in the Example 1 were heated in air at 500° C. for one hour, and then were immersed in the slurry, air dried at 50° C. and heated at 100° C. for eight hours, to provide catalyst structures having a ternary catalyst of $MnO_2/TiO_2/Ag_2O$ supported thereon.

The catalyst structures were then deposited in the same manner as in the Example 1, to form a reactor.

Example 5

SUS wires of 2 mm in diameter which had aluminum thermally sprayed thereon in about 10 $\mu m$ thickness were heated in air at 900° C. for one hour, to produce alumina on the surface.

The wires were treated in the same manner as in the Example 4 to provide catalyst structures having a ternary catalyst of $MnO_2/TiO_2/Ag_2O$ supported thereon.

The wires were arranged parallel in a casing to extend in the axial direction of the casing at intervals of 5 mm, as illustrated in FIG. 3, to form a reactor. The effective length in total of the wires was 175 mm, so that the reactor had a gas contact area of about 17.5 $m^2/m^3$ per unit volume.

B. Measurement of Ozone Decomposition Rate

Ozone decomposition rate was measured with the reactors manufactured in the Examples 1-5 in the same manner as in the Example II at a temperature of 20°-70° C. The results are shown in the Table 3.

TABLE 3

| | Temperature of Carrier Material (°C.) | Ozone Concentration at Inlet (ppm) | CA Values[*] |
|---|---|---|---|
| Example 1 | 50 | 100 | 1000 |
| | 60 | 100 | 1000 |
| | 70 | 100 | 1000 |
| Example 2 | 20 | 1000 | 1000 |
| | | 500 | 5000 |
| | | 1000 | 10000 |
| | 30 | 100 | 1000 |
| | | 500 | 5000 |
| | | 1000 | 10000 |
| | 50 | 100 | 1000 |
| | | 500 | 5000 |
| | | 1000 | 10000 |
| Example 3 | 30 | 1000 | 10000 |
| | 40 | 1000 | 10000 |
| | 50 | 1000 | 10000 |
| Example 4 | 30 | 1000 | 10000 |
| | 40 | 1000 | 10000 |
| | 50 | 1000 | 10000 |
| Example 5 | 30 | 1000 | 10000 |
| | 40 | 1000 | 10000 |
| | 50 | 1000 | 10000 |

| | Ozone Decomposition Rate | | |
|---|---|---|---|
| | | After | |
| | Initial | 100 hours (%) | 1000 hours |
| Example 1 | 47.5 | 6.4 | 2.6 |
| | 72.6 | 40.1 | 15.0 |
| | 80.8 | 78.6 | 78.8 |
| Example 2 | 61.0 | 29.1 | 5.4 |
| | 56.8 | 21.3 | 4.8 |
| | 53.5 | 24.3 | 6.8 |
| | 69.0 | 39.1 | 11.8 |
| | 63.8 | 29.9 | 7.5 |
| | 55.3 | 19.4 | 4.5 |
| | 82.4 | 82.8 | 82.2 |
| | 71.7 | 64.6 | 43.0 |
| | 65.5 | 56.1 | 28.1 |
| Example 3 | 88.4 | 78.3 | 27.3 |
| | 96.8 | 92.9 | 68.9 |
| | 98.2 | 98.2 | 98.4 |
| Example 4 | 87.0 | 76.8 | 52.7 |
| | 93.6 | 87.4 | 77.4 |
| | 99.5 | 99.4 | 99.5 |
| Example 5 | 47.0 | 37.4 | 9.0 |
| | 53.7 | 47.3 | 40.3 |
| | 55.2 | 55.0 | 55.0 |

[*] ppm · $m^3/m^2$ · hr

What is claimed is:

1. A method of decomposing ozone, comprising contacting a gas containing ozone with a porous carrier sheet having an ozone decomposition catalyst supported thereon, said porous carrier sheet composed of an electrically-resistant material having a plurality of micropores not less than 30 $\mu m$ in diameter in the direction of thickness of the sheet, while electrifying and heating the electrically-resistant material.

2. A method as recited in claim 1, wherein the gas containing ozone is passed through the porous carrier sheet.

3. A method as recited in claim 1, wherein the gas containing ozone is passed along the porous carrier sheet.

4. A method as recited in claim 1, wherein the electrically-resistant material is in the form of a screen.

5. A method as recited in claim 1, wherein the electrically-resistant material is in the form of a corrugated screen, mesh or plate.

6. A method as recited in claim 1, wherein the electrically-resistant material is metal or ceramic.

7. A method as recited in claim 6, wherein the metal is stainless steel.

8. A method as recited in claim 1, wherein the electrically-resistant material is heated to a temperature up to 70° C.

* * * * *